(12) United States Patent
Schäfer et al.

(10) Patent No.: US 12,186,853 B2
(45) Date of Patent: Jan. 7, 2025

(54) HYDRAULIC ARRANGEMENT FOR AN APPARATUS FOR DEBLOCKING WORKPIECES, IN PARTICULAR EYEGLASS LENSES, FROM ASSOCIATED BLOCK PIECES

(71) Applicant: Satisloh AG, Baar (CH)

(72) Inventors: Holger Schäfer, Weilmünster (DE); Steffen Wallendorf, Wetzlar-Dutenhofen (DE); Martin Lautz, Wetzlar-Nauborn (DE); Gregor Pavel, Hüttenberg (DE)

(73) Assignee: Satisloh AG, Baar (CH)

( * ) Notice: Subject to any disclaimer, the term of this patent is extended or adjusted under 35 U.S.C. 154(b) by 246 days.

(21) Appl. No.: 17/761,137

(22) PCT Filed: Sep. 7, 2020

(86) PCT No.: PCT/EP2020/000149
§ 371 (c)(1),
(2) Date: Mar. 16, 2022

(87) PCT Pub. No.: WO2021/052613
PCT Pub. Date: Mar. 25, 2021

(65) Prior Publication Data
US 2023/0347467 A1 Nov. 2, 2023

(30) Foreign Application Priority Data
Sep. 16, 2019 (DE) ..................... 10 2019 006 505.0

(51) Int. Cl.
*B08B 3/02* (2006.01)
*B08B 11/00* (2006.01)
(Continued)

(52) U.S. Cl.
CPC ............ *B24B 13/0057* (2013.01); *B08B 3/02* (2013.01); *B08B 11/00* (2013.01); *B24B 9/146* (2013.01);
(Continued)

(58) Field of Classification Search
None
See application file for complete search history.

(56) References Cited

U.S. PATENT DOCUMENTS 8,141,220 B2 3/2012 Guardia Aura
8,616,150 B2 12/2013 Savoie et al.
(Continued)

FOREIGN PATENT DOCUMENTS

EP 3517284 A1 7/2019
KR 101672543 B1 11/2016
WO 2012062956 A1 5/2012

OTHER PUBLICATIONS

German Office Action, Serial No. 102019006505.0, Applicant: Satisloh AG, Date: May 15, 2020.
(Continued)

*Primary Examiner* — Levon J Shahinian
(74) *Attorney, Agent, or Firm* — Reising Ethington P.C.

(57) ABSTRACT

A hydraulic arrangement (HA) for an apparatus (AV) for deblocking optical workpieces (L), from associated block pieces (B), includes a nozzle arrangement (DA) for delivery of high pressure jets of pressure means for deblocking the workpiece from the associated block piece at a first pressure and for cleaning the blocked workpiece and/or block piece at least one second pressure which is different from the first pressure. Furthermore, there is a pump device (PE) which applies pressure in a defined manner to the pressure means and conveys it under pressure to the nozzle arrangement. The pump device has at least one high pressure pump (HP1,
(Continued)

HP2) which is drivable by an associated rotary drive (SM1, SM2), the speed of which is modifiable in order to adjust the first pressure or the second pressure.

24 Claims, 10 Drawing Sheets

(51) Int. Cl.
| | |
|---|---|
| *B24B 9/14* | (2006.01) |
| *B24B 13/005* | (2006.01) |
| *B26D 7/00* | (2006.01) |
| *B28D 7/00* | (2006.01) |
| *B28D 7/04* | (2006.01) |
| *F04B 19/04* | (2006.01) |
| *F04B 23/02* | (2006.01) |
| *F04B 23/06* | (2006.01) |
| *F04B 49/20* | (2006.01) |
| *F04B 49/22* | (2006.01) |
| *F15B 11/17* | (2006.01) |

(52) U.S. Cl.
CPC ............ *B26D 7/00* (2013.01); *B28D 7/00* (2013.01); *B28D 7/04* (2013.01); *F04B 19/04* (2013.01); *F04B 23/06* (2013.01); *F04B 49/20* (2013.01); *F04B 49/22* (2013.01); *F15B 11/17* (2013.01); *B08B 2203/0223* (2013.01); *B08B 2203/027* (2013.01); *Y02P 80/10* (2015.11)

(56) References Cited

U.S. PATENT DOCUMENTS

| | | |
|---|---|---|
| 8,931,769 B2 | 1/2015 | Pavel et al. |
| 9,120,196 B2 | 9/2015 | Geurts et al. |
| 9,272,437 B2 | 3/2016 | Hashish et al. |
| 9,302,130 B2 | 4/2016 | Aho et al. |
| 10,428,809 B2 | 10/2019 | Kawamori et al. |
| 2015/0233184 A1 | 8/2015 | Pettay |
| 2016/0222950 A1* | 8/2016 | Kawamori ............ F04B 23/02 |
| 2020/0130126 A1 | 4/2020 | Schneider et al. |

OTHER PUBLICATIONS

PCT International Search Report, Int. Application No. PCT/EP2020/000149, Int. Filing Date: Sep. 7, 2020, Applicant: Satisloh AG, Date: Jan. 26, 2021.

PCT International Preliminary Report on Patentability, Int. Application No. PCT/EP2020/000149, Int. Filing Date: Sep. 7, 2020, Applicant; Satisloh AG, Date: Mar. 31, 2022.

China 1st Office Action, Application No. 202080065145.3, Applicant: Satisloh AG, Title: Hydraulic Arrangement for an Apparatus for Blocking Optical Workpieces, in Particular Eyeglass Lensed, form Associated Block Pieces, Dated: May 26, 2023.

\* cited by examiner

HYDRAULIC ARRANGEMENT FOR AN APPARATUS FOR DEBLOCKING WORKPIECES, IN PARTICULAR EYEGLASS LENSES, FROM ASSOCIATED BLOCK PIECES

TECHNICAL FIELD

The present invention relates generally to a hydraulic arrangement for an apparatus for deblocking optical workpieces from associated block pieces. In particular, the invention relates to a hydraulic arrangement for a device an apparatus for deblocking spectacle lenses, such as are widely employed in modern "RX workshops", i.e. industrial production facilities for production of individual spectacle lenses according to prescription.

STATE OF THE ART

In optical production, "blocking-on" or, for short, "blocking" generally denotes the procedure in which an optical workpiece is temporarily fastened by a suitable material (alloyed material of low melting point-so-called "alloy"—or adhesive) on a so-called "block piece" or, however, the blocking material is coated on the workpiece so as to itself form the block piece, which then serves the purpose of holding the workpiece in the respective processing machine and/or coating system. Accordingly, in optical production that process in which the optical workpiece after (final) processing thereof (at surface and/or edge) and/or coating thereof is again separated from the block piece or blocking material is called "deblocking".

Spectacle lenses are blocked on a large scale in the afore-mentioned RX workshops before each blocked spectacle lens is then processed by material removal with geometrically defined cutting (milling/turning) or geometrically undefined cutting (grinding/polishing) at its back surface or front surface with respect to its optical effect and/or at the edge for fitting in an associated spectacle frame and/or is coated on its back surface or front surface for achieving additional effects (increase in scratch resistance, anti-reflection properties, vapor deposition, hydrophobic properties, etc.).

When in the following in connection with the present invention mention is made in general of "spectacle lenses" as preferred field of use there are to be understood by that optical lenses or lens preforms (blanks) for spectacles of customary materials such as polycarbonate, mineral glass, CR 39, HI-index, etc., which may have any desired (preliminary) shape of the circumferential edge of the lens or lens blank and which prior to blocking may—but do not have to—have already undergone (preliminary) processing and/or (preliminary) coating at one optically effective surface or both optically effective surfaces and/or at the edge. In addition, the spectacle lens can be provided on its surface, at which it is or is to be blocked, with a film, a lacquer or the like so as to protect this surface from contamination and damage and/or to improve the adhesion characteristics between spectacle lens and blocking material.

In the prior art there is no lack of proposals as to how a device for the deblocking of spectacle lenses can be constructed, wherein a pressure medium such as water is usually used to detach the spectacle lens from the block piece by application of hydraulic forces. In that regard, a technological approach has become established in which the application of hydraulic forces takes place from "outside" and, in particular, by a high-pressure water jet, which is delivered by a nozzle and impinges on an edge location between block piece and spectacle lens (for example WO 2008/003805 A1, FIG. 1, water jet 7; DE 10 2009 048 590 A1, FIG. 5, high-pressure water jet HDS; DE 10 2010 010 334 A1, FIG. 6, high-pressure water jet H).

Thus, an apparatus for the deblocking of spectacle lenses is known from document DE 10 2009 048 590 A1, comprising a first movement device for rotation of the spectacle lens, which is blocked on a block piece, about a workpiece axis of rotation, a nozzle subassembly with a nozzle for delivery of a high-pressure water jet in a direction substantially transverse to the workpiece axis of rotation onto an edge region between spectacle lens and block piece, and a second movement device for producing a relative movement between the spectacle lens and the nozzle along the workpiece axis of rotation. In that case, the spectacle lens can be displaced with respect to the nozzle—or conversely the nozzle with respect to the spectacle lens—by the second movement device along the workpiece axis of rotation under positional regulation so that the high-pressure water jet is directed onto a predetermined point of incidence in the edge region between spectacle lens and block piece. Moreover, a further nozzle for delivery of a further, rotating high-pressure jet in the deblocking apparatus, which serves the purpose of, in particular, "peeling off" from the spectacle lens any blocking material which might still adhere to the deblocked spectacle lens, can be provided for cleaning the deblocked spectacle lens.

A pump is used in this prior art for generating pressure and for conveying the pressure medium to the nozzles. More precisely, a high-pressure pump is provided which is driven by an electric motor so as to suck the pressure medium, namely non-temperature-controlled mains water, from a reservoir and convey it at a high water pressure of, for example, 120 bar to the nozzle. A collection trough for the water delivered by the nozzle and a return, which leads back to the reservoir, for this water are also present.

An electrically driven high-pressure pump is similarly provided in the deblocking apparatus disclosed in the document DE 10 2010 010 334 A1. The high-pressure pump comprises a pressure connection, which is hydraulically connected by way of a resilient high-pressure hose with a nozzle for delivery of a high-pressure pressure medium jet, and a suction connection, which is in fluid connection by way of a further hose length with a trough section, so that the high-pressure pump can suck water as pressure medium from the trough section, into which the water used for deblocking also returns. In this way, operation is possible with always the same water in a closed circuit. In that regard, a filter in the hose length prevents any dirt particles from being sucked up and being able to cause damage to the spectacle lens and/or the deblocking apparatus. The pressure of the water delivered by way of the pressure connection can be set by a pressure regulator (valve).

Provided in this prior art for activation of the high-pressure pump is a switching arrangement which can be actuated by slight manual lowering of a protective hood of the deblocking apparatus from the closed position thereof against the spring force of compression springs. If the user relieves the pressure hood, then the compression springs urge the protective hood back upwardly and the switch arrangement is opened. In this way it is ensured that the high-pressure pump can be activated only when the protective hood is closed and for that purpose user intervention is additionally needed (further pressing down of the protective hood against spring force); as soon as the protective hood is relieved by the user, the high-pressure pump switches off.

However, this form of activation of the high-pressure pump causes intermittent pump operation, which in long-term use on an industrial scale would harbor the risk of pump damage due to cavitation corrosion phenomena.

Finally, document DE 10 2017 001 679 A1, discloses an apparatus for deblocking a lens from a block piece on which the lens is blocked with the aid of a blocking material, wherein a blocking side of the lens is optionally provided with a protective layer or protective film. This prior art apparatus comprises a work space, a first holding device for rotational holding of the lens in the work space, a second holding device for rotational holding of the block piece in the work space, and a plurality of nozzle devices for delivery of fluid jets in the work space. Specifically, three nozzle devices for generating a first, a second and an additional fluid jet in the work space are provided, wherein the first fluid jet can be used for detaching the lens with the protective layer—insofar as present—from the blocking material, the second fluid jet for removal of blocking material from the block piece and the additional fluid jet for removal of the protective layer and/or of blocking material from the lens.

Operation is usually with fluid jets, which correspond with the respective requirements, of different pressure for detaching the lens from the block piece and for cleaning the lens and block piece (removal of the protective layer or of the blocking material), wherein in an industrial production environment it is necessary to take into consideration that on the one hand the respective process segment is to elapse as quickly as possible and on the other hand the lens still to be unblocked or already unblocked does not experience damage during detaching or cleaning.

Finally, in this connection it is known from document DE 10 2017 001 679 A1 (FIG. 7) to employ a pump by which the used water is sucked out of a tank and conducted or fed to the nozzle devices by way of a line. In that regard, the supply is carried out at the desired pressure or the pressure is set by appropriate controlling and regulating valves. However, further details with respect thereto cannot be inferred from this prior art.

What is desired is to provide a hydraulic arrangement, which is constructed as simply and compactly as possible and is usable in an industrial production environment, for an apparatus for deblocking optical workpieces, particularly spectacle lenses, from associated block pieces, which arrangement reliably enables generation of pressure appropriate to process.

SUMMARY OF THE INVENTION

One aspect of the invention is directed to a hydraulic arrangement for an apparatus or deblocking optical workpieces, particularly spectacle lenses, from associated block pieces.

According to one aspect of the invention, a hydraulic arrangement for an apparatus for deblocking optical workpieces, particularly spectacle lenses, from associated block pieces, comprises a nozzle arrangement for delivery of high-pressure pressure medium jets for deblocking the workpiece from the associated block piece at a first pressure and for cleaning the deblocked workpiece and/or the block piece at at least one second pressure differing from the first pressure, as well as a pump device which separates a low-pressure section from a high-pressure section of the hydraulic arrangement and serves the purpose of loading the pressure medium, which is fed by way of the low-pressure section, in defined manner with pressure and conveying it under pressure to the nozzle arrangement in the high-pressure section. The pump device comprises at least one high-pressure pump drivable by an associated rotary drive, the rotational speed of which is variable for setting the first pressure or the second pressure, and/or the pump device comprises a first high-pressure pump and a second high-pressure pump, wherein at least the first pressure can be generated by the first high-pressure pump and at least the second pressure can be generated by the second high-pressure pump.

According to one aspect of the present invention the rotational speed of the rotary drive for the at least one high-pressure pump can thus be set and varied in order to convey to the nozzle arrangement the pressure medium in a manner appropriate to process, i.e. in correspondence with the respective requirement, for example at a first (higher) drive rotational speed with the first (greater) pressure (for example 160 bar) for deblocking purposes or at a second (lower) drive rotational speed with the second (lesser) pressure (for example a pressure between 80 and 160 bar) for cleaning purposes. By comparison with the prior art hydraulic arrangements for a deblocking apparatus in which the pressure medium is conveyed by the pump device always at a maximum pressure and the pressure is then set or reduced by way of a valve arrangement for the respective process segment (deblocking or cleaning) before the pressure medium ultimately passes to the nozzle arrangement, the hydraulic concept according to the invention offers several advantages. On the one hand, the pressure can be generated by the possible rotational speed default for the rotary drive of the high-pressure pump in a very energy-efficient manner already at a level appropriate to process, by contrast to the prior art where at the outset a maximum pressure—possibly too high for cleaning purposes—is generated and then has to be reduced by the valve arrangement in adaptation to the respective process segment, i.e. in part has to be "negated" again. On the other hand, the (individual) high-pressure pump or the drive thereof can be dimensioned to be smaller, because it is not necessary to design for permanent generation of the maximum pressure. This also leads in practice to a significant reduction in constructional size of the pump device.

Alternatively or in addition thereto, according to a another aspect of the present invention in summary it is provided that the pump device comprises two high-pressure pumps for generating different pressures. In that regard, in again very energy-efficient manner appropriate to need one high-pressure pump can deliver the first (greater) pressure for deblocking and the other high-pressure pump the second (lesser) pressure for cleaning and, in fact, even at the same time if the stated process segments are to elapse simultaneously for different optical workpieces, which is preferred. The above dimensioning and design advantages for the high-pressure pumps or the drives thereof similarly arise with this aspect of the invention, even when the drive rotational speed of the high-pressure pumps is not to be variable.

Of particular advantageous with respect to pressure generation appropriate to process is a combination of the afore-described measures, i.e. provision of two high-pressure pumps with rotary drives, the rotational speed of each which is variable for the setting of pressure. Thus, for example, in the case of appropriate hydraulic circuitry use can be made of one or the other high-pressure pump for the respective process segment (deblocking or cleaning) and thus the respective pump workload can be controlled.

In a preferred embodiment of the hydraulic arrangement with two high-pressure pumps it is provided that a respective servomotor as rotary drive is associated with each of the high-pressure pumps of the pump device and is drivingly connected with the respective high-pressure pump by way of an angle transmission. In a concrete design, the individual high-pressure pump can convey pressure medium under a pressure of 200 bar at, for example, a supply rotational speed of 1,000 rpm, which in the case of a servomotor with a usual rated rotational speed of 3,000 rpm as rotary drive of the high-pressure pump requires a translation ratio of 3:1 at the angle transmission. In fact, other forms of transmission are similarly conceivable here, for example gearwheel or chain transmissions, but, with respect to a smallest possible need for constructional space with a high degree of efficiency, angle transmissions are preferred. With further regard to the preferred use of servomotors, these are particularly distinguished by the fact that-apart from the capability of satisfactory and precise regulation of rotational speed and thus also the capability of regulation of the pressure of the driven high-pressure pumps-acceleration and braking ramps can be defined. Cavitation effects in the compressor stages can thus be advantageously counteracted.

In the case of the hydraulic arrangement with two high-pressure pumps in the pump device the high-pressure pumps are in addition preferably of identical construction, which is of advantage particularly with respect to costs and the matter of replacement parts.

Moreover, in principle high-pressure pumps of any form of construction can be employed in the pump device of the present hydraulic arrangement as long as they are suitable for long-term delivery of the required pressure, thus, for example, gearwheel pumps, axial pumps, radial pumps and reciprocating piston pumps. The use of plunger pumps is preferred in the present case, particularly with respect to highest possible fatigue strength.

In principle, it is conceivable to equip the nozzle arrangement in the high-pressure section of the hydraulic arrangement with only one, optionally suitably adjustable or positionable, high-pressure nozzle for both of, namely, deblocking and cleaning of the optical workpieces or block pieces. However, it is preferred if the nozzle arrangement in the high-pressure section of the hydraulic arrangement comprises a first nozzle subassembly with a first high-pressure nozzle for delivery of the high-pressure pressure medium jet for deblocking the workpiece from the associated block piece and a second nozzle subassembly with a second high-pressure nozzle for delivery of the high-pressure pressure medium jet for cleaning the deblocked workpiece and/or the block piece. Thus, with advantage different, individually especially suitable forms of nozzle can be used for the different process segments, for example a fan nozzle for delivery of a fanned high-pressure jet for the deblocking and a cleaning nozzle for delivery of a rotating high-pressure jet for the cleaning. In addition, different workpieces can in a given case be simultaneously deblocked or cleaned.

An embodiment of the hydraulic arrangement is particularly preferred in which the nozzle arrangement in the high-pressure section of the hydraulic arrangement also comprises a third nozzle subassembly with a third high-pressure nozzle for delivery of a high-pressure pressure medium jet for cleaning the block piece and/or the workpiece. Thus, the individual high-pressure nozzles can be placed or positioned in an arrangement and orientation optimized for the respective process segment. Moreover, workpiece and block piece can be cleaned simultaneously with the two associated high-pressure nozzles, whilst another workpiece may be simultaneously deblocked.

In further pursuance of the concept of the invention the first high-pressure pump and the second high-pressure pump can be arranged in parallel, wherein each of the high-pressure pumps is selectably connectible with each of the high-pressure nozzles by way of a common distributor device in the high-pressure section of the hydraulic arrangement. As a result, a redundancy is advantageously given in which each high-pressure pump can serve each process segment. In addition, the high-pressure pumps can be operated in optimized manner with respect to workload so that, for example, not always one and the same high-pressure pump has to generate the pressure which is required for deblocking and which is usually greater by comparison with the cleaning pressure. This is ultimately also conducive to reliable long-term operation of the deblocking apparatus. Moreover, the entire process can be carried out with deblocking and cleaning steps optimized in time.

In that regard, in an expedient and economic embodiment the arrangement can be such that the distributor device comprises two supply lines which are each in fluid connection with a respective one of the high-pressure pumps, wherein associated with each supply line is a plurality of high-pressure switching valves by way of which a fluid connection from the supply lines to the respective high-pressure nozzle is selectably producible. Depending on the configuration of the high-pressure switching valves, respectively associated non-return valves can also be provided so as to ensure that the respective high-pressure switching valve retains its set switching state even when hydraulic pressure is present.

If in such an embodiment of the hydraulic arrangement a further high-pressure switching valve is optionally associated with each supply line as bypass, wherein the respective supply line is selectably connectible by way of the further valve with a tank for the pressure medium, then the high-pressure pumps can be operated continuously. If no deblocking or cleaning process is being carried out just then, the high-pressure pumps convey the pressure medium by way of the opened bypass back into the tank. This is of advantage particularly with respect to a longest possible service life of the high-pressure pumps, because then the high-pressure pumps do not have to be operated intermittently, which in long-term use on an industrial scale would harbor the risk of pump damage due to cavitation corrosion phenomena, which can arise particularly when pump rotational speed ranges, which are critical with respect thereto, are frequently traversed during running up and running down of the pump drives.

In principle, the high-pressure switching valves can optionally be actuable, for example electromagnetically or hydraulically, to also act on both sides, i.e. in both switch settings (open or closed). However, the high-pressure switching valves are preferably pneumatically actuable against spring bias, which is not only conducive to a simple valve configuration, but is also advantageous and economic with respect to energy, especially because compressed air as operating medium is in any case usually present at a deblocking apparatus. In that regard, the high-pressure switching valves can be spring-biased into closed setting, which by comparison with an equally conceivable spring biasing into open setting is preferred for avoidance of a run-on pressure.

It is further preferred from safety aspects and with respect to a good possibility for maintenance of the hydraulic arrangement if an excess-pressure valve is associated with each supply line, the respective supply line being connectible with the tank for the pressure medium by way of that valve if a predetermined pressure (for example 200 bar) is exceeded, and/or if each supply line can be hydraulically relieved by way of an emergency discharge and/or is connected with a pressure measuring device. In the event of maintenance, the hydraulic arrangement can be relieved of pressure in simple manner by the emergency discharge. If the pressure in the system is too high, the excess-pressure valves open and thus ensure that the high-pressure components (pumps, valves, screw connections, pipes, hoses, etc.) do not suffer damage.

In principle the individual hydraulic components of the distributor device can be connected together by free piping consisting of pipes, connectors, T-pieces, L-pieces, distributors, etc. However, an embodiment of the hydraulic arrangement is preferred in which the distributor device has a common valve block in which the supply lines are formed as channels or bores and which carries the high-pressure switching valves. By comparison with free piping, significantly fewer mounting and sealing points are present in such a block mode of construction as a consequence of a smaller number of components and in addition a significantly more compact unit can thus be realized more economically. Moreover, the common valve block can be provided with fastening threads and thus advantageous directly mounted.

Finally, at least one low-pressure nozzle, which can be supplied with the pressure medium by way of a low-pressure switching valve connected with a feed line for the pressure medium, can be provided in the low-pressure section for cleaning purposes. Such low-pressure nozzles can, for example, serve for the rinsing of housing components of the deblocking apparatus, such as funnels or collection troughs, or, however, serve as a tank nozzle by which contaminants in the tank are kept in suspension so that they can be pumped out. Thus, one and the same hydraulic system is advantageously also used for subordinate purposes.

BRIEF DESCRIPTION OF THE DRAWINGS

The invention is explained in more detail in the following on the basis of a preferred embodiment with reference to the accompanying partly simplified or schematic drawings, which are not to scale and in which.

Figure 1:
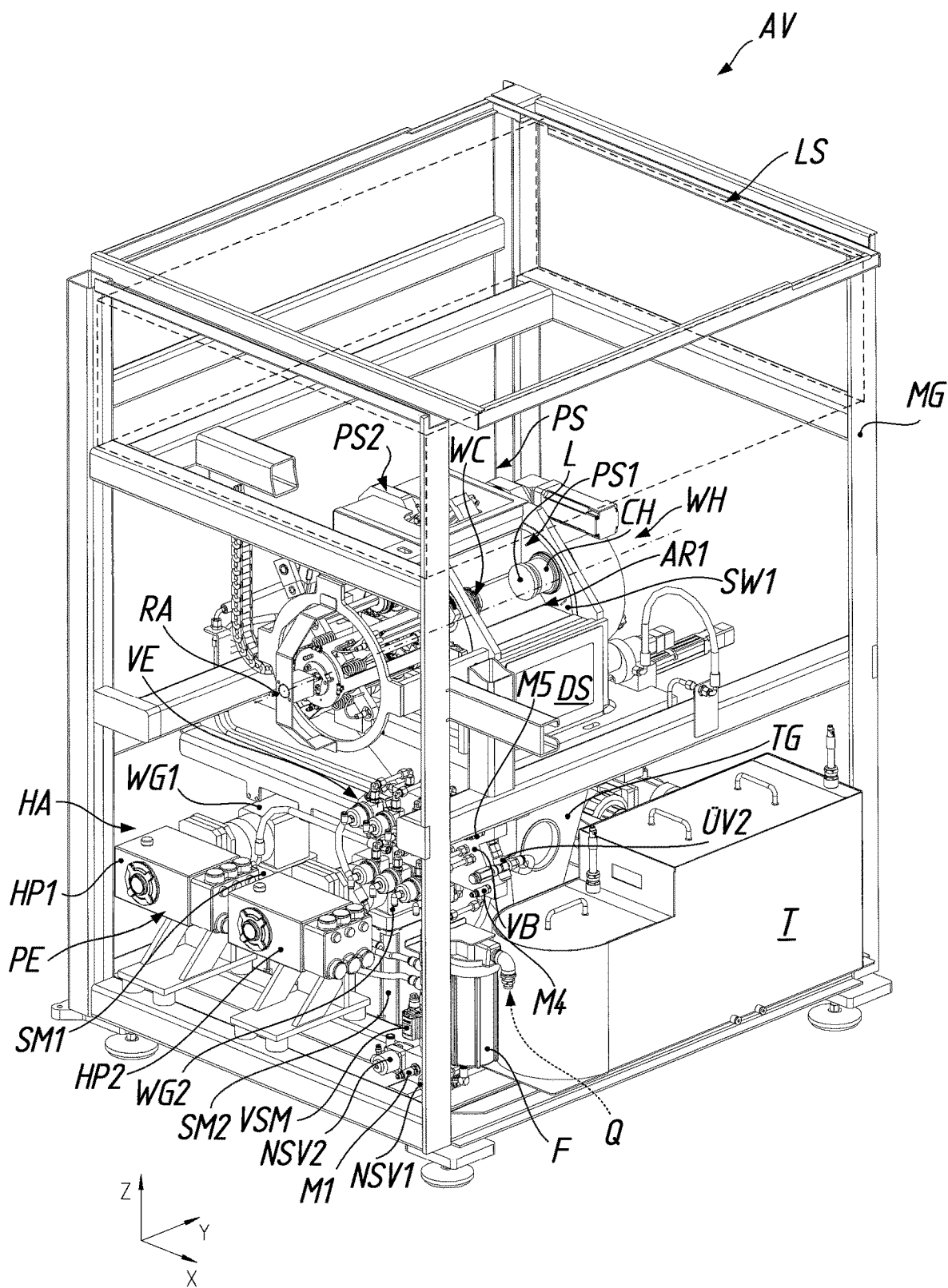
FIG. 1 shows a perspective view of a deblocking apparatus for deblocking optical workpieces, namely spectacle lenses, from associated block pieces from obliquely above and front left, with a hydraulic arrangement according to the invention in a lower region of the deblocking device, comprising in general a nozzle arrangement for deblocking and cleaning the workpieces or block pieces and a pump device for hydraulic supply of the nozzle arrangement.

With respect to the drawings it may be noted at this point that the illustration of the deblocking apparatus with the hydraulic arrangement according to the invention is in a right-angled Cartesian co-ordinate system in which the letter x denotes the length direction, the letter y denotes the width direction and the letter z denotes the height direction of the deblocking apparatus or the hydraulic arrangement. In order to reveal a view of essential components or subassemblies of the deblocking apparatus and the hydraulic arrangement and for simplification of the illustration, the control cabinet, the control panel, parts of the cladding, the supply devices (inclusive of lines, hoses and pipes) for current and compressed air, the suction device and the measuring, maintenance and safety devices, in particular, were mostly omitted in the drawings, because they do not appear necessary for an understanding of the invention and/or are in any case familiar to the expert.

DETAILED DESCRIPTION OF THE EMBODIMENT

Figure 2:
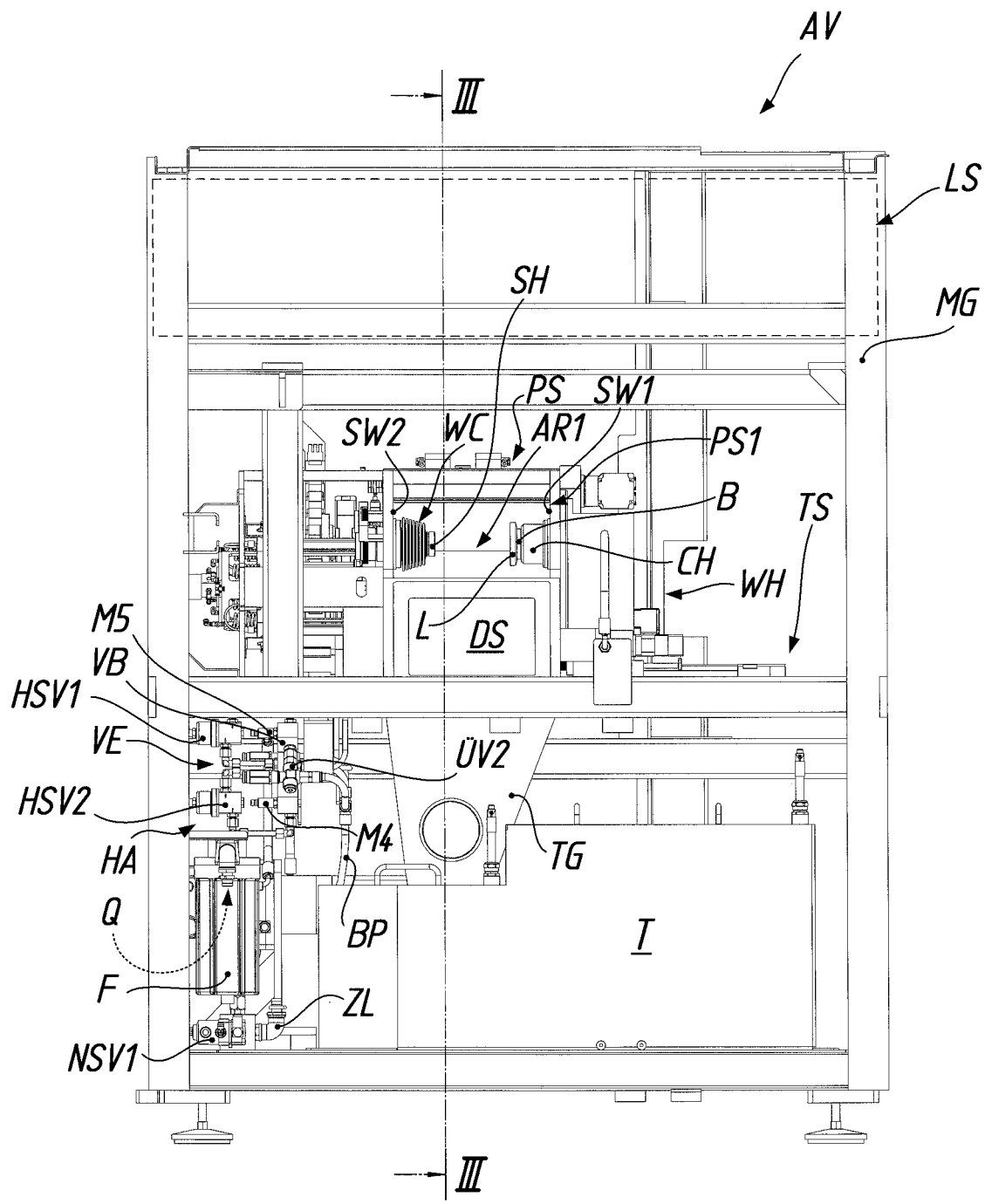
FIG. 2 shows a front view of the deblocking apparatus according to FIG. 1.
Figure 3:
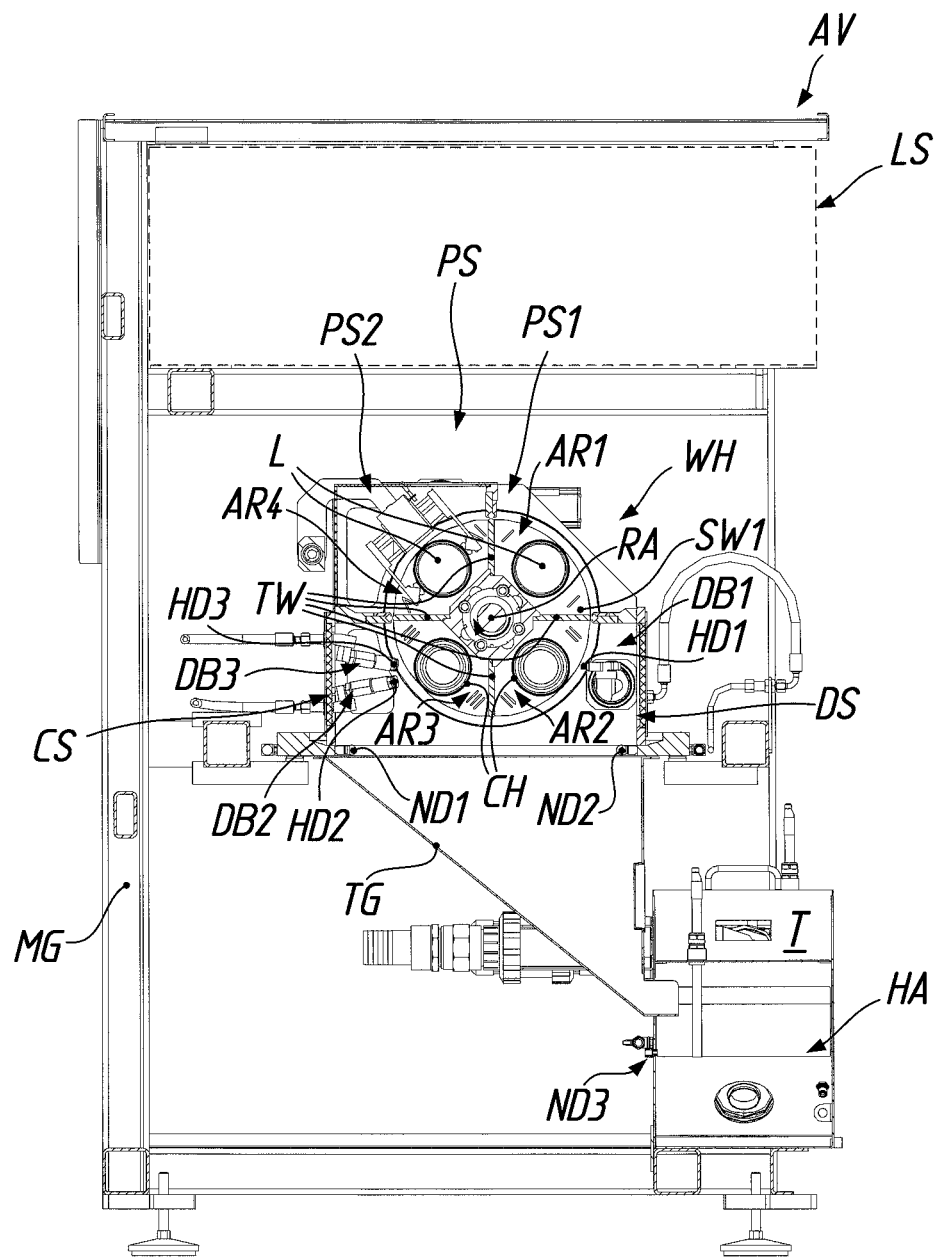
FIG. 3 shows a sectional view of the deblocking apparatus according to FIG. 1 in correspondence with the section line III-III in FIG. 2, from which, in particular, details of the nozzle arrangement can be inferred, the nozzle arrangement comprising a first high-pressure nozzle for delivery of a high-pressure pressure medium jet for deblocking the workpieces, a second high-pressure nozzle for delivery of a high-pressure pressure medium jet for cleaning the deblocked workpieces and a third high-pressure nozzle for delivery of a high-pressure pressure medium jet for cleaning the block pieces.

A deblocking apparatus for deblocking optical workpieces, such as spectacle lenses L, from associated block pieces B is generally denoted by the reference AV in FIGS. 1 to 3. The deblocking device AV comprises a machine frame MG, on which, as core element of the deblocking device AV, a specially constructed workpiece holding arrangement WH is movably mounted at a central point, the holding arrangement being further described in the following to the extent appearing desirable for a better understanding of the present invention.

The basic construction of the deblocking apparatus AV and, in particular, of the workpiece holding arrangement WH is the subject of parallel U.S. patent application Ser. No. 17/761,148 based on PCT/EP2020/000151 with priority of German Patent Application DE 10 2019 006 504.2, i.e. filed with the same application date, under the title "Optical machine for treatment and/or processing optical workpieces, such as spectacle lenses, as well as deblocking apparatus and deblocking method therefor", to which at this point for the avoidance of repetition express reference may be made with respect to the more precise structure and function of the deblocking apparatus AV in general and the workpiece holding arrangement WH specifically U.S. patent application Ser. No. 17/761,148 based on PCT/EP2020/000151 is hereby incorporated by reference.

As can be readily recognized in FIG. 3, different stations of the deblocking apparatus AV are grouped in stationary position at the machine frame MG around the workpiece holding arrangement WH. The stations are, firstly, a loading station PS at the top, comprising a first sub-station PS1 (top right in FIG. 3) for loading spectacle lenses L, which are blocked on block pieces B, prior to the deblocking and for unloading block pieces B after the deblocking, as well as a second sub-station PS2 (top left in FIG. 3) for unloading deblocked spectacle lenses L after the deblocking. Mounted on the machine frame MG at a three-dimensional spacing from the loading station PS are, below the loading station PS, a deblocking station DS (bottom right in FIG. 3) as first treatment station for deblocking spectacle lenses L from the respectively associated block piece B and a cleaning station CS (bottom left in FIG. 3) as further treatment station for cleaning the deblocked spectacle lenses L and the block pieces B.

According to FIG. 3, the deblocking station DS comprises as a first treatment device a first nozzle subassembly DB1 with a first high-pressure nozzle HD1 for delivery of a high-pressure pressure medium jet for deblocking the spectacle lenses L from the respectively associated block piece B. The deblocking takes place at a first hydraulic pressure of, for example, 160 bar. According to FIG. 3 the cleaning station CS further comprises as a second treatment device a second nozzle subassembly DB2 with a second high-pressure nozzle HD2 for delivery of a high-pressure pressure medium jet for cleaning the deblocked spectacle lenses L. As can be similarly inferred from FIG. 3, the cleaning station further comprises as a third treatment device a third nozzle subassembly DB3 with a third high-pressure nozzle HD3 for delivery of a high-pressure pressure medium jet for cleaning the block pieces B. Cleaning takes place at a second pressure which differs from the first pressure and which can lie, for example, between 80 and 160 bar depending on the spectacle lens L or block piece B.

The hydraulic supply of the nozzle arrangement DA formed by the nozzle subassemblies DB1, DB2, DB3 (cf. FIGS. 4 and 12) takes place by way of a hydraulic arrangement HA, which is described in more detail in the following and which according to, in particular, FIGS. 1 and 2 is mounted on the machine frame MG in a lower region, laterally below the workpiece holding arrangement WH. This hydraulic arrangement HA generally comprises a pump device PE, by which temperature-controlled water as pressure medium can be conveyed from a tank T by way of a distributor device VE of the hydraulic arrangement HA to the nozzle subassemblies DB1, DB2, DB3. In addition, amongst other things low-pressure nozzles ND1, ND2— which according to FIG. 3 are associated with the deblocking station DS and the cleaning station CS—are connected with the hydraulic arrangement HA so as to deliver a low-pressure pressure medium jet for cleaning the respective station DS, CS.

Arranged at approximately the same height as the workpiece holding arrangement WH and on the right in FIG. 2 adjacent to the workpiece holding arrangement WH is a transfer station TS for deposit of spectacle lenses L blocked on block pieces B, deblocked spectacle lenses L and block pieces B. The transfer station TS can comprise a conveyor belt (not illustrated here), which is mounted on the machine frame MG, for transport of job trays serving for reception of spectacle lenses L blocked on block pieces B, deblocked spectacle lenses L and block pieces B.

Mounted on the machine frame MG and above the workpiece holding arrangement WH and the transfer station TS is a loading system LS (indicated by dashed lines in FIGS. 1 to 3) by which the spectacle lenses blocked on block pieces B, deblocked spectacle lenses L and block pieces B can be transported between the transfer station TS and the loading station PS provided at the workpiece holding arrangement WH and can be placed in and removed from the respective station TS, PS. The loading system LS is the subject of the parallel U.S. patent application Ser. No. 17/761,148 based on PCT/EP2020/000150 with priority of German Patent Application DE 10 2019 006 503.4, i.e. filed on the same application date, under the title "Loading system for an optical machine, particularly for loading and unloading optical workpieces, such as spectacle lenses, and deblocking apparatus comprising such a loading system", to which for the avoidance of repetition express reference may be made at this point with respect to the construction and function of the loading system LS. U.S. patent application Ser. No. 17/761,148 based on PCT/EP2020/000150 is hereby incorporated by reference.

A funnel-shaped housing section TG for collection in common of pressure medium, blocking material and other residues for preparation or disposal is arranged, as can be seen in FIGS. 1 to 3, below the deblocking and cleaning stations DS, CS, which are themselves positioned below the loading station PS for best possible draining of the water needed in the process.

Further details with regard to the workpiece holding arrangement WH can be inferred from, in particular FIG. 3. Accordingly, a feature of the workpiece holding arrangement WH is that the workpiece holding arrangement WH comprises a plurality of partition walls TW, which separate and delimit four work spaces AR1, AR2, AR3 and AR4 from one another (also marked in FIG. 3 by the Roman numerals I I, II II, III III, IV IV respectively applied at the end). In that case, an individual workpiece holder CH (cf. FIGS. 1 and 2), here in each instance in the form of a clamping chuck, is associated with each work space AR1, AR2, AR3 and AR4 for parallel use for different spectacle lenses L.

The work spaces AR1, AR2, AR3 and AR4 can be moved in common together with the workpiece holding arrangement WH with respect to the machine frame MG so that each work space AR1, AR2, AR3 and AR4 can be selectably displaced from the loading station PS, which is stationary at the machine frame MG, to the treatment or processing stations DS, CS physically spaced from the loading station, and conversely. More precisely, each work space AR1, AR2, AR3 and AR4 can be displaced together with the workpiece holding arrangement WH in a movement cycle (indicated by a central circular arrow in FIG. 3) from the first sub-station PS1 of the loading station PS (quadrant at top right in FIG. 3) via the deblocking station DS (quadrant at bottom right), the cleaning station CS (quadrant at bottom left) and the second sub-station PS2 of the loading station PS (quadrant at top left) back to the first sub-station PS1 of the loading station PS so that the work spaces AR1, AR2, AR3 and AR4 can be used simultaneously for different spectacle lenses L and different processes (loading, deblocking, cleaning, unloading). This means for the hydraulic arrangement HA that hydraulic pressure must be available at the same time not only for the deblocking process, but also for the cleaning processes.

For this cyclic operation the work spaces AR1, AR2, AR3 and AR4 of the workpiece holding arrangement WH together with their workpiece holders CH are arranged to be rotatable about a common axis RA of rotation. The overall result is a drum-like construction of the workpiece holding arrangement WH with two mutually opposite end walls SW1, SW2, between which the partition walls TW separating the work spaces AR1, AR2, AR3 and AR4 are arranged. In that regard, the axis RA of rotation runs through the mutually parallel end walls SW1, SW2.

Whereas a first end wall SW1 of the workpiece holding arrangement WH of drum-like construction carries the workpiece holders CH, as can be readily seen in FIG. 2, a second end wall SW2 of the workpiece holding arrangement WH carries, according to FIG. 2, workpiece counter-holders WC which are aligned with the workpiece holders CH. Moreover, not only the workpiece holders CH, but also the workpiece counter-holders WC are, in addition, each mounted to be rotatable about the longitudinal axis thereof. In other words, the result is a circular arrangement of four spindle pairs which are uniformly mutually angularly spaced from one another around the axis RA of rotation. In addition, the workpiece counter-holders WC are each axially displaceable along the longitudinal axis thereof parallel to the axis RA of rotation. In that regard, the workpiece counter-holders WC are each provided at the end thereof projecting into the respective workspace AR1, AR2, AR3 and AR4 with a suction head SH for holding the spectacle lens L (cf. FIG. 2), by way of which the spectacle lens L is drawn off the block piece B at the time of deblocking.

Figure 4:
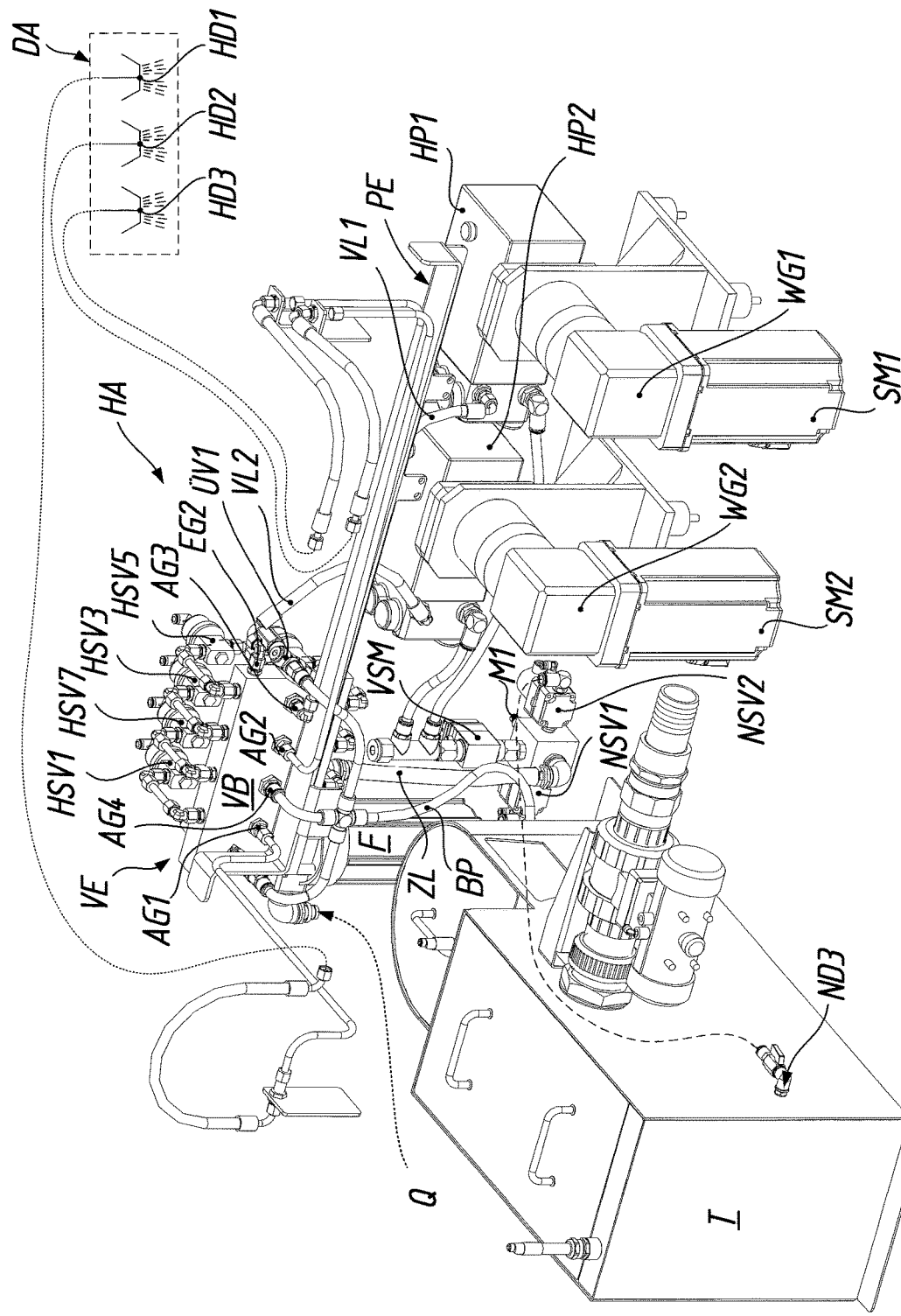
FIG. 4 shows a perspective view of the hydraulic arrangement—separated from the deblocking apparatus according to FIG. 1—from obliquely above and back right, without the high-pressure nozzles, with a view of a distributor device of the hydraulic arrangement, the distributor device being arranged between the nozzle arrangement schematically indicated in FIG. 4 and the pump device.
Figure 5:
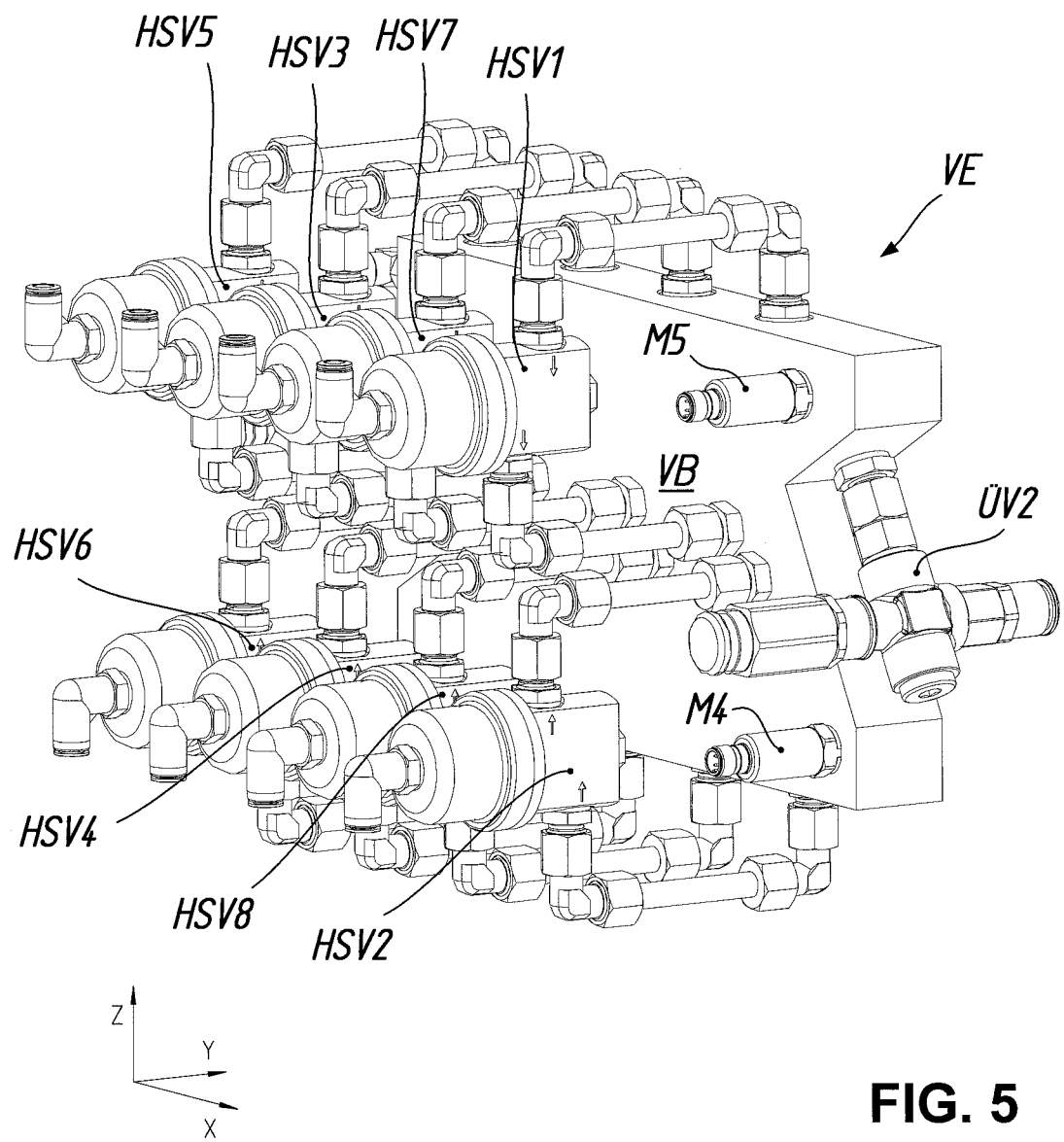
FIG. 5 shows a perspective view of the distributor device—separated from the hydraulic arrangement according to FIG. 4—from obliquely above and front left, the distributor device having a common valve block which carries, inter alia, high-pressure switching valves for hydraulic loading of the nozzle arrangement.
Figure 6:
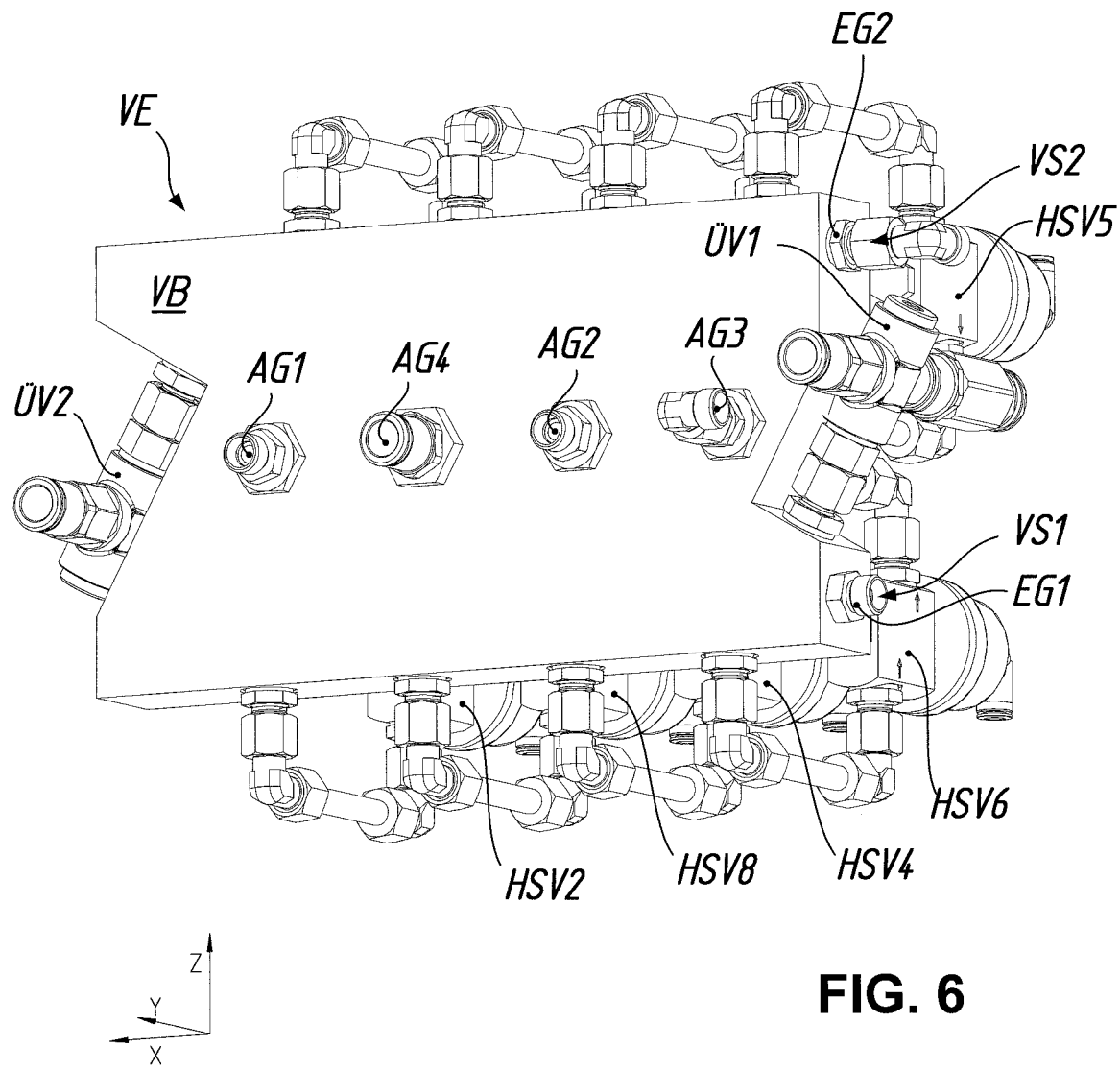
FIG. 6 shows a perspective view of the distributor device, which is shown in FIG. 5, from obliquely below and back right.
Figure 7:
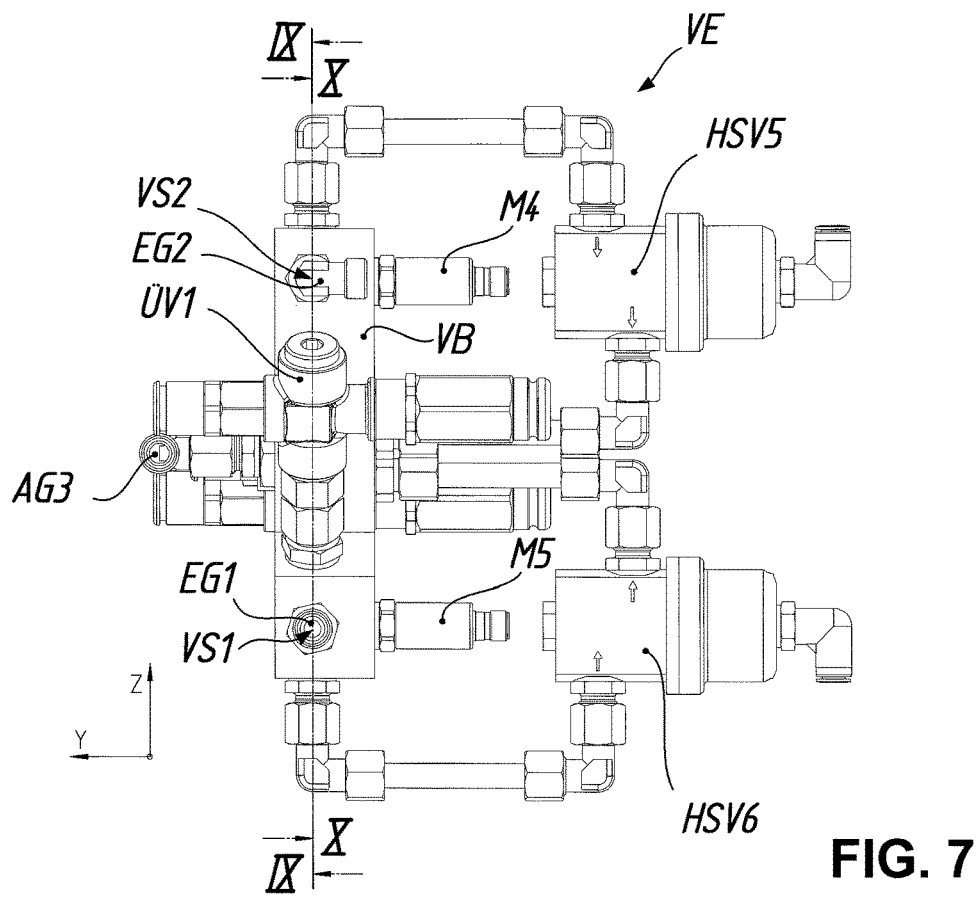
FIG. 7 shows a back view of the distributor device according to FIG. 5 from the right in FIG. 6.
Figure 8:
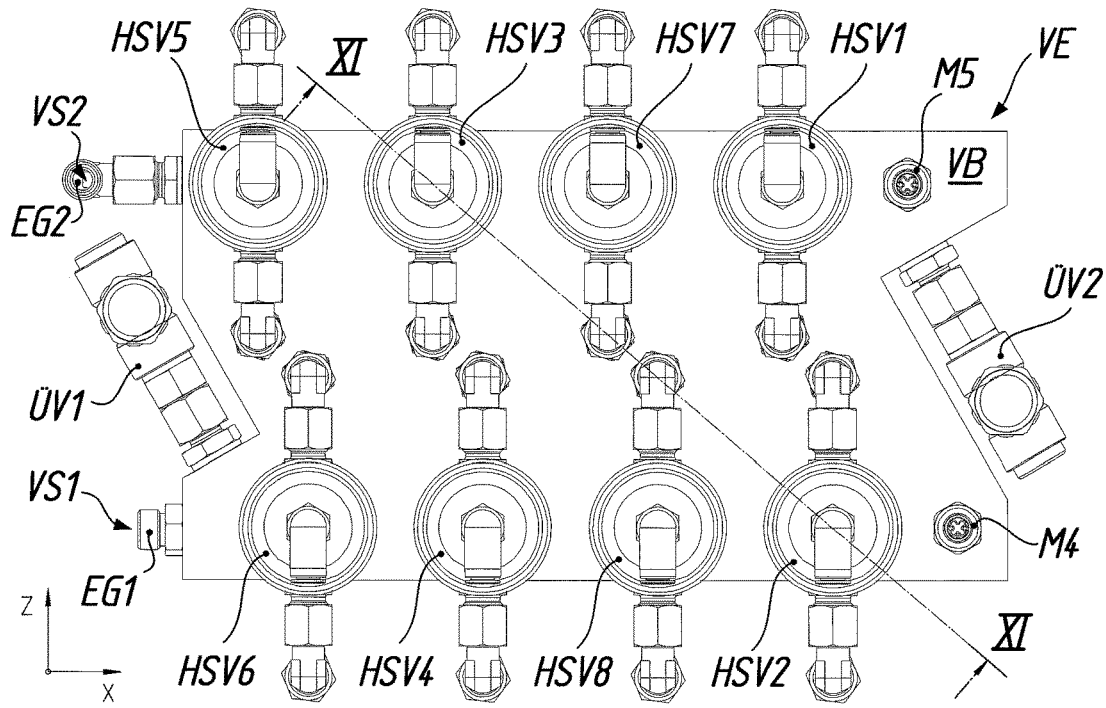
FIG. 8 shows a side view of the distributor device according to FIG. 5 from the right in FIG. 7.
Figure 9:
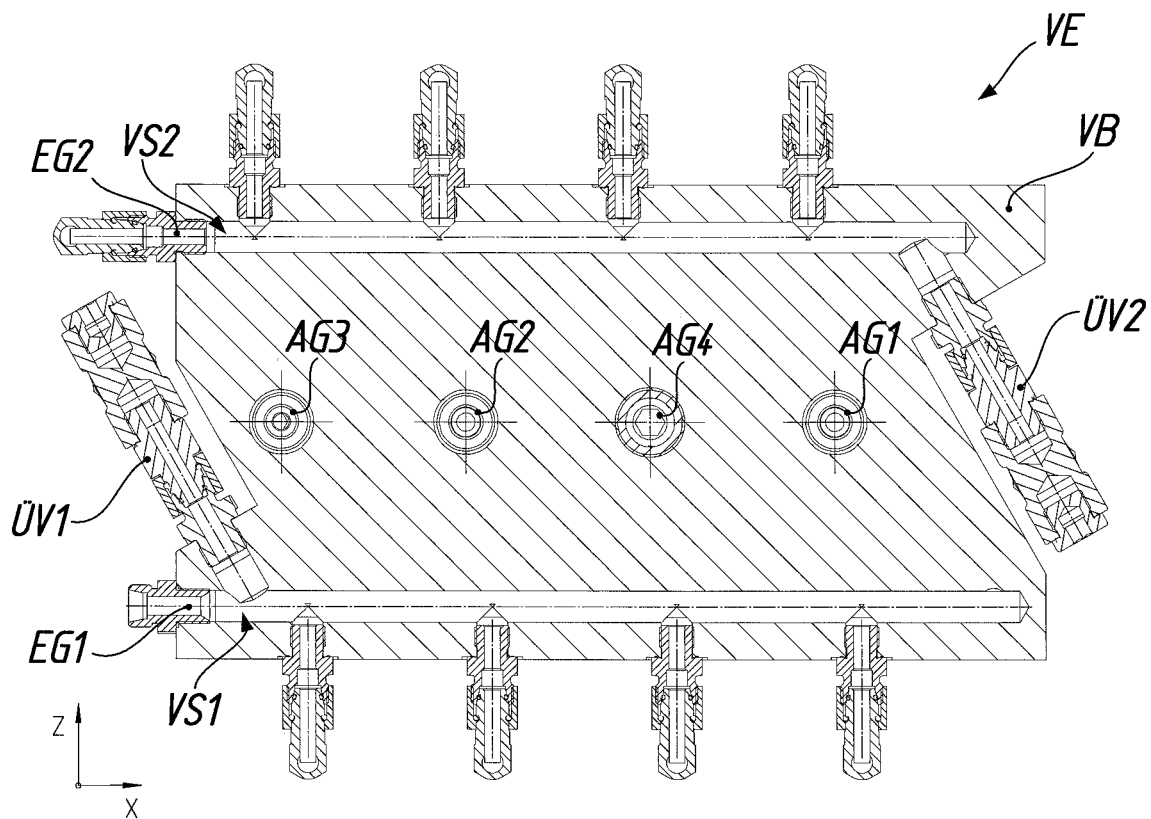
FIG. 9 shows a sectional view of the distributor device according to FIG. 5 in correspondence with the section line IX-IX in FIG. 7 (i.e. as seen from the right in FIG. 7)
Figure 10:
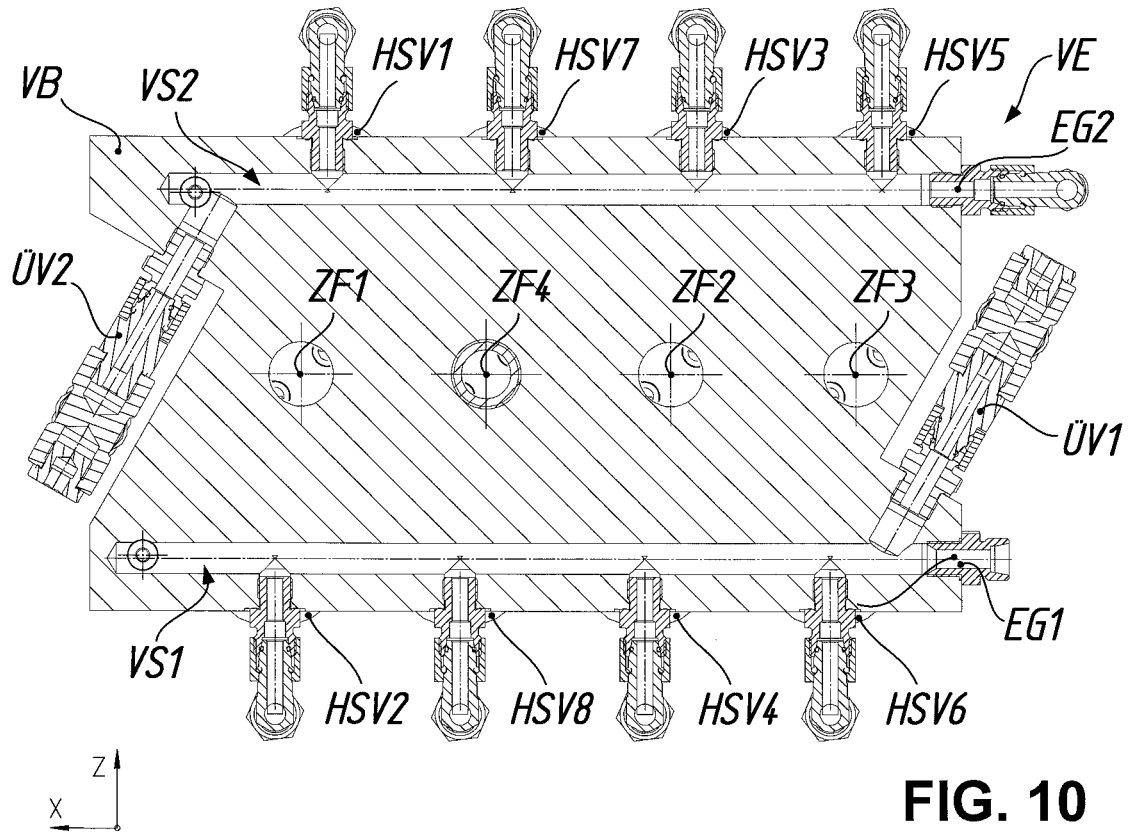
FIG. 10 shows a sectional view of the distributor device according to FIG. 5 in correspondence with the section line X-X in FIG. 7 (i.e. as seen from the left in FIG. 7)
Figure 11:
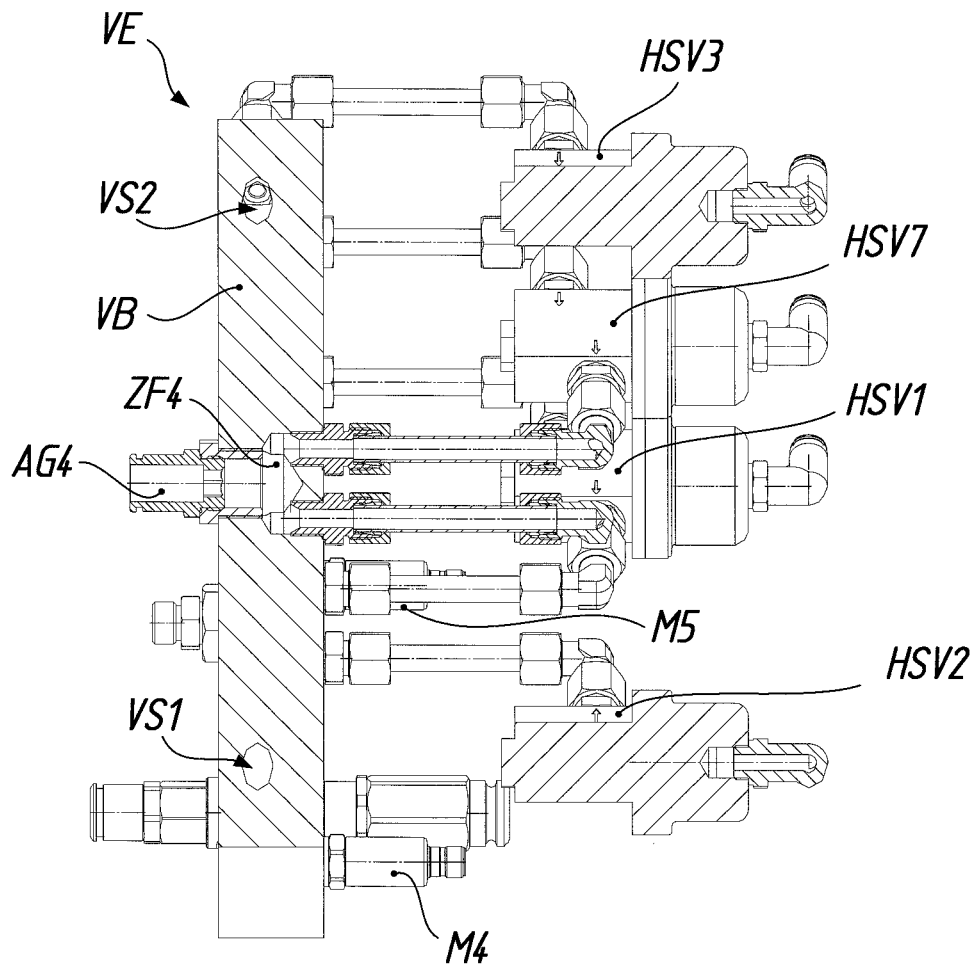
FIG. 11 shows a sectional view of the distributor device according to FIG. 5 in correspondence with the section line XI-XI in FIG. 8.
Figure 12:
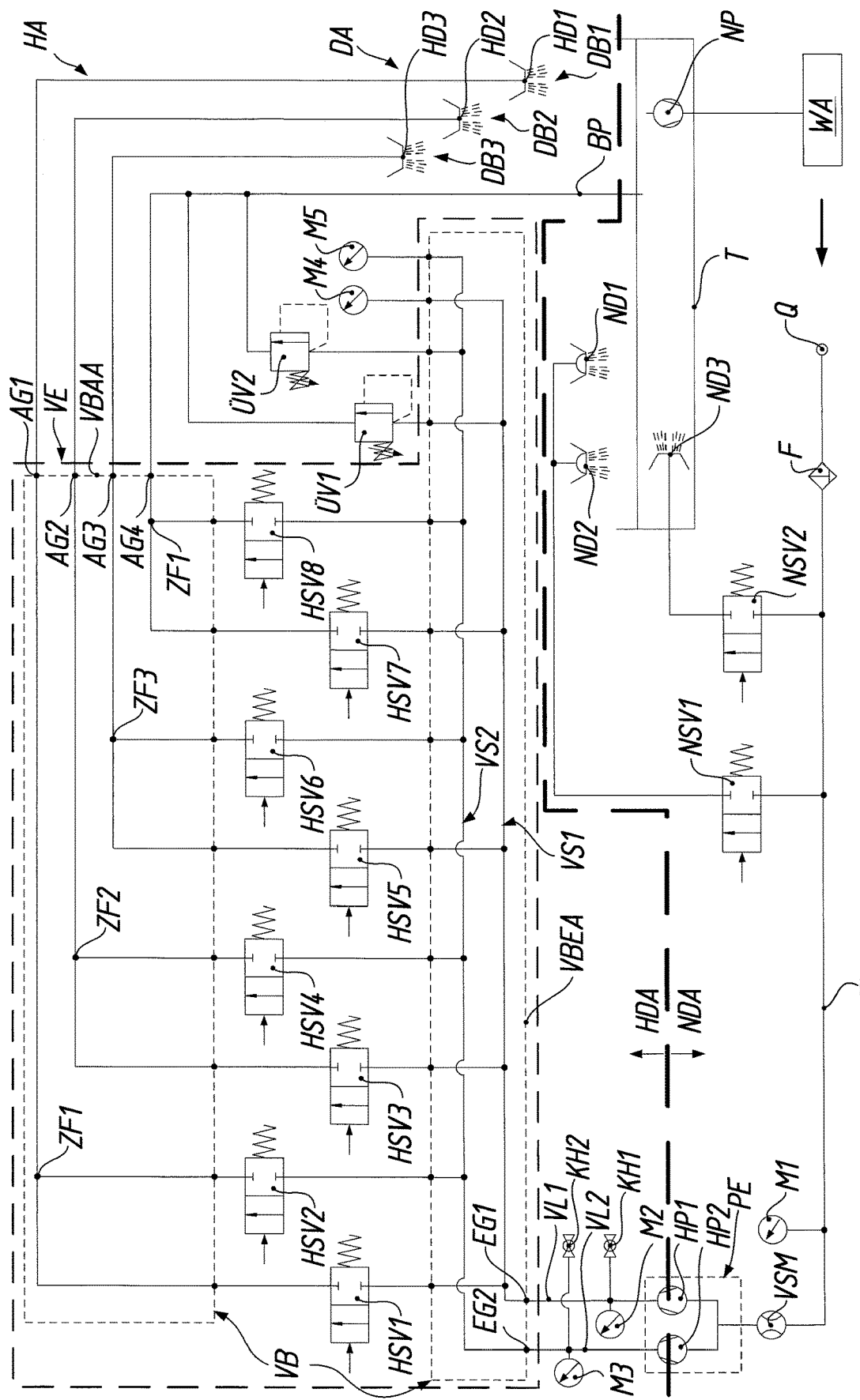
FIG. 12 shows a circuit diagram of the hydraulic arrangement according to the invention.

With regard to further details of the hydraulic arrangement HA, firstly reference is made to FIG. 4 and the hydraulic circuit diagram according to FIG. 12. The pump device PE, which according to FIG. 12 separates a low-pressure section NDA from a high-pressure section HDA of the hydraulic arrangement HA (indicated in FIG. 12 by a thick dashed line), has the task of loading the pressure medium (water), which is fed by way of the low-pressure section NDA, in defined manner with pressure and conveying it under pressure to the nozzle arrangement DA in the high-pressure section HDA.

According to FIG. 4 the pump device PE comprises for that purpose a first high-pressure pump HP1 and a second high-pressure pump HP2. Each of the high-pressure pumps HP1, HP2 is driven by an associated rotary drive, the rotational speed of which can be varied for setting the afore-mentioned first pressure for the deblocking or the said second pressure for the cleaning. The pressure can be set with appropriate sensitivity to the respective process requirements by suitable regulation of rotational speed; similarly, it is possible to define acceleration and braking gradients so as to counteract, for example, cavitation effects in the compressor stages.

More precisely, associated with each of the high-pressure pumps HP1, HP2 of the pump device PE is a respective servomotor SM1, SM2 as rotary drive, which is drivingly connected with the respective high-pressure pump HP1, HP2 by way of an angle transmission WG1, WG2, as shown in FIG. 4. It can also be seen in FIG. 4 how compactly these servomotor and angle transmission combinations are constructed. In the illustrated embodiment in each instance the high-pressure pumps HP1, HP2, the angle transmissions WG1, WG2 and the servomotors SM1, SM2 are identical, i.e. of the same construction. For preference, plunger pumps are used here as high-pressure pumps HP1, HP2 of the pump device PE.

As can be best seen in the circuit diagram according to FIG. 12, the first high-pressure pump HP1 and the second high-pressure pump HP2 of the pump device PE are arranged in parallel. In that case, each of the high-pressure pumps HP1, HP2 can be selectably connected with each of the high-pressure nozzles HD1, HD2, HD3 of the nozzle arrangement DA by way of the common distributor device VE (indicated in FIG. 12 by a medium-thick dashed line) in the high-pressure section HDA of the hydraulic arrangement HA. In other words, each of the high-pressure pumps HP1, HP2 can operate each of the high-pressure nozzles HD1, HD2, HD3 by way of a flexible hydraulic distribution.

As FIG. 12 further shows, the distributor device VE has for that purpose two supply lines VS1, VS2 which are each in fluid connection with a respective one of the high-pressure pumps HP1, HP2. In that case, as considered generally a respective plurality (here in each case three) of high-pressure switching valves HSV1, HSV3, HSV5; HSV2, HSV4, HSV6 is associated with each supply line VS1, VS2, a fluid connection from the supply lines VS1, VS2 to the respective high-pressure nozzle HD1, HD2, HD3 being selectably producible by way of the valves. In addition, a further high-pressure switching valve HS7, HSV8 is associated as bypass with each supply line VS1, VS2, the respective supply line VS1, VS2 being selectably connectible with the tank T for the pressure medium by way of the further valve via a bypass line BP.

In the illustrated embodiment the high-pressure switching valves HSV1, HSV2, HSV3, HSV4, HSV5, HSV6, HSV7, HSV8 are pneumatically actuable against spring bias. In that regard, the high-pressure switching valves HSV1, HSV2, HSV3, HSV4, HSV5, HSV6, HSV7, HSV8 are spring-biased into closed setting and thus have to be loaded with compressed air for opening.

In an advantageously simple constructional embodiment the distributor device VE has a common valve block VB, which is illustrated in more detail in FIGS. 5 to 11. As, in particular, FIGS. 9 and 10 each show in a sectional view the supply lines VS1, VS2 are formed in the valve block VB as (longitudinal) channels.

The valve block VB is also provided with the hydraulic inlets EG1, EG2 for the distribution as well as with the hydraulic outlets AG1, AG2, AG3, AG4 thereof of the individual high-pressure nozzles HD1, HD2, HD3 of the nozzle arrangement DA or the bypass line BP to the tank T and transverse channels (see FIGS. 9 to 11) for formation of junctions ZF1, ZF2, ZF3, ZF4, which serve the purpose of bringing together the hydraulic outlets of a valve pair HSV1/HSV2, HSV3/HSV4, HSV5/HSV6, HSV7/HSV8, advantageously without further piping, to form a respective one of the hydraulic outlets AG1, AG2, AG3, AG4 of the valve block VB.

Last, but not least, the valve block VB forms a mechanical support for the high-pressure switching valves HSV1, HSV2, HSV3, HSV4, HSV5, HSV6, HSV7, HSV8 and further hydraulic components, which are described in more detail in the following with reference to FIG. 12. In that regard, the valve block VB can be mounted as a compact unit with little effort on the machine frame MG of the deblocking apparatus AV.

As can be inferred from the circuit diagram, which is illustrated in FIG. 12, of the hydraulic arrangement HA, firstly the tank T is provided in the low-pressure section NDA of the hydraulic arrangement HA, in which the pressure-free pressure medium for the hydraulic arrangement HA is collected. From the tank T the pressure medium is pumped by a low-pressure pump NP to a water preparation device WA, which is known per se. A tank circulation, which is not, however, illustrated in FIG. 12, can optionally take place between the tank T and the water preparation device WA. The water preparation device WA supplies a source Q with a pressure medium under admission pressure. In that case, the pressure medium can be made available, optionally in temperature-controlled state, for promoting or accelerating the deblocking process. The source Q supplies a feed line ZL in the low-pressure section NDA of the hydraulic arrangement HA, the line ending at the high-pressure pumps HP1, HP2, which are connected in parallel, of the pump device PE.

Connected into the feed line ZL directly behind the source Q as seen in flow direction is, firstly, a filter F which keeps back any contaminants from the water preparation device WA. Such contaminants could otherwise lead to damage of the spectacle lenses L during deblocking or cleaning.

In addition, three low-pressure nozzles ND1, ND2, ND3 for cleaning purposes, which are connected by way of two low-pressure switching valves NSV1, NSV2 with the feed line ZL and can be supplied with pressure medium, are a component of the low-pressure section NDA of the hydraulic arrangement HA. The low-pressure nozzles ND1, ND2, which are supplied in common by way of the first low-pressure switching valve NSV1, are the afore-described cleaning nozzles which are associated with the deblocking station DS or the cleaning station CS and which are shown in FIG. 3. The third low-pressure nozzle ND3 is associated with the tank T for "tank movement" so as to keep any contaminants in the water in suspension, the contaminants then being able to pass by way of the tank circulation to the water preparation device WA.

A first manometer M1 and a volume flow measuring device VSM are connected with the feed line ZL in front of the high-pressure pumps HP1, HP2. The manometer M1 serves the purpose of monitoring the admission pressure of the pressure medium, which passes to the high-pressure pumps HP1, HP2. The volume flow in the feed line ZL is detected by the volume flow measuring device VSM. In the event of a reduced supply being ascertained a control (not illustrated) can intervene in the pump operation.

The first high-pressure pump HP1 is connected by way of a first connecting line VL1 with the first inlet EG1 of the valve block VB of the distributor device VE, whilst the second high-pressure pump HP2 is connected by way of a second connecting line VL2 with the second inlet EG2 of the valve block VB of the distributor device VE. As a result, the two supply lines VS1, VS2 are each connected with a respective one of the high-pressure pumps HP1, HP2.

Each supply line VS1, VS2 is optionally connected with a pressure measuring device M2, M3 and can be hydraulically relieved by way of an emergency discharge KH1, KH2 (not shown in FIGS. 1, 2 and 4). For that purpose, in the circuit diagram illustrated in FIG. 12 a second manometer M2 for visual pressure detection and a first ball cock KH1 are arranged in the first connecting line VL1 and a third manometer M3 for visual pressure detection and a second ball cock KH2 are arranged in the second connecting line VL2. In the event of maintenance it is possible with a hydraulic arrangement HA of such configuration for the pressure prevailing in the high-pressure section HDA behind the forcibly conveying high-pressure pumps HP1, HP2 to also be hydraulically relieved manually by way of the ball cocks KH1, KH2 if the complete deblocking apparatus AV has been switched to be free of voltage by, for example, actuation of an emergency off switch.

The valve block VB of the distributor device VE has a valve block inlet section VBEA and a valve block outlet section VBAA (indicated in FIG. 12 by thin dashed lines). Provided in the valve block inlet section VBEA are the two supply lines VS1, VS2 which, as already mentioned above with reference to FIGS. 9 and 10, are connected as (longitudinal) channels with the inlets EG1, EG2 of the valve block VB and thus are in fluid connection with the first and second high-pressure pumps HP1, HP2, respectively.

The four junctions ZF1, ZF2, ZF3, ZF4 are provided in the valve block outlet section VBAA and are each hydraulically connected with a respective one of the four outlets AG1, AG2, AG3, AG4 of the valve block outlet section VBAA. Of the outlets, the first outlet AG1 is connected with the first high-pressure nozzle HD1 of the first nozzle subassembly DB1, the second outlet AG2 is connected with the second high-pressure nozzle HD2 of the second nozzle subassembly DB2, the third outlet AG3 is connected with the third high-pressure nozzle HD3 of the third nozzle subassembly DB3 and the fourth outlet AG4 is connected with the bypass line BP.

The eight high-pressure switching valves HSV1, HSV2, HSV3, HSV4, HSV5, HSV6, HSV7, HSV8 are arranged between the valve block inlet section VBEA and the valve block outlet section VBAA. In that case, in the valve block inlet section VBEA the first, third, fifth and seventh high-pressure valves HSV1, HSV3, HSV5, HSV7 are hydraulically connected with the first supply line VS1 and the second, fourth, sixth and eighth high-pressure switching valves HSV2, HSV4, HSV6, HSV8 are hydraulically connected with the second supply line VS2. In the valve block outlet section VBAA, the outlets of the first and second high-pressure switching valves HSV1, HSV2 are led together at the first junction ZF1, the outlets of the third and fourth high-pressure switching valves HSV3, HSV4 are led together at the second junction ZF2, the outlets of the fifth and sixth high-pressure switching valves HSV5, HSV6 are led together at the third junction ZF3 and the outlets of the seventh and eighth high-pressure switching valves HSV7, HSV8 are led together at the fourth junction ZF4.

In the thus-configured valve circuit each of the high-pressure pumps HP1, HP2 can thus be selectably connected by way of the supply lines VS1, VS2 in the valve block VB with each of the high-pressure nozzles HD1, HD2, HD3 through appropriate pneumatic pressure loading of one of the high-pressure switching valves HSV1, HSV2, HSV3, HSV4, HSV5, HSV6. Moreover, each supply line VS1, VS2 can be selectably connected by way of the seventh and eighth high-pressure switching valves HSV7, HSV8 with the fourth outlet AG4 and thus with the bypass line BP, by way of which the respective supply line VS1, VS2 to the tank T for the pressure medium can be relieved of pressure.

In addition, associated with each supply line VS1, VS2 is an excess-pressure valve ÜV1, ÜV2, which is connected with the bypass line BP and by way of which the respective supply line VS1, VS2 can conduct pressure medium away to the tank T if a predetermined pressure (for example 200 bar) is exceeded. The excess-pressure valves ÜV1, ÜV2 are, according to FIGS. 5 to 10, mounted on the valve block VB at the end. Finally, the pressure in the supply lines VS1, VS2 can also be monitored by way of the respectively associated manometers M4, M5. The latter are similarly mounted on the valve block VB, as shown in FIGS. 5, 7, 8 and 11.

By virtue of the thus-formed hydraulic arrangement HA the afore-described deblocking apparatus AV with simultaneous high-pressure process steps (deblocking and cleaning) can be supplied by way of two high-pressure pumps HP1, HP2 without reduction in performance and in a manner which is advantageous with respect to energy. In that regard, the high-pressure pumps HP1, HP2 can be very flexibly switched into and off from each process step; for preference, the high-pressure pumps HP1, HP2 run permanently and convey, even if no high-pressure process is to be operated at that moment, by way of the bypass formed in the circuit. Moreover, it is possible to set the required pressures rapidly and accurately. Finally, the two high-pressure pumps HP1, HP2 together with their servomotors SM1, SM2 adjustable in rotational speed for pressure setting can be subjected to uniform workload, in which case it is always possible to preselect and set the pressure appropriate to process.

A hydraulic arrangement for a device for deblocking optical workpieces, such as spectacle lenses, from associated block pieces comprises a nozzle arrangement for delivery of high-pressure pressure medium jets for deblocking the workpiece from the associated block piece at a first pressure and for cleaning the deblocked workpiece and/or block piece at at least one second pressure different from the first pressure. In addition, a pump device is provided, which serves the purpose of loading the pressure medium with pressure in defined manner and conveying it under pressure loading to the nozzle arrangement. In order to enable pressure generation appropriate to process in reliable manner, the pump device comprises at least one high-pressure pump drivable by an associated rotary drive, the rotational speed of which is variable for setting the first pressure or the second pressure. Alternatively or in addition thereto the pump device comprises two high-pressure pumps serving the purpose of generating the first pressure and the second pressure.

Variations and modifications are possible without departing from the scope and spirit of the present invention as defined by the appended claims.

What is claimed is:

1. A hydraulic arrangement (HA) for an apparatus (AV) for deblocking optical workpieces (L) from associated block pieces (B), comprising
    a nozzle arrangement (DA) for delivery of high-pressure pressure medium jets for deblocking the workpiece (L) from the associated block piece (B) at a first pressure and for cleaning the deblocked workpiece (L) and/or the block piece (B) at at least one second pressure different from the first pressure, and
    a pump device (PE) which separates a low-pressure section (NDA) from a high-pressure section (HDA) of the hydraulic arrangement (HA) and serves the purpose of loading the pressure medium, which is fed by way of the low-pressure section (NDA), in defined manner with pressure and of conveying it under pressure to the nozzle arrangement (DA) in the high-pressure section (HDA),
    characterized in that the pump device (PE) comprises a first high-pressure pump (HP1) and a second high-pressure pump (HP2), at least one of said first and second high-pressure pumps (HP1, HP2) being drivable by an associated rotary drive (SM1, SM2), the rotational speed of which is variable for setting the first pressure of the second pressure, wherein at least the first pressure can be generated by the first high-pressure pump (HP1) and at least the second pressure can be generated by the second high-pressure pump (HP2), and
    wherein a respective servomoter (SM1, SM2) is associated as rotary drive with each of the high-pressure pumps (HP1, HP2) of the pump device (PE) and is drivingly connected with the respective high-pressure pump (HP1, HP2) by way of an angle transmission (WG1, WG2).

2. A hydraulic arrangement (HA) according to claim 1, characterized in that the high-pressure pumps (HP1, HP2) of the pump device (PE) are of identical construction.

3. A hydraulic arrangement (HA) according to claim 1, characterized in that the high-pressure pumps (HP1, HP2) of the pump device (PE) are constructed as a plunger pumps.

4. A hydraulic arrangement (HA) for an apparatus (AV) for deblocking optical workpieces (L) from associated block pieces (B), comprising
    a nozzle arrangement (DA) for delivery of high-pressure pressure medium jets for deblocking the workpiece (L) from the associated block piece (B) at a first pressure and for cleaning the deblocked workpiece (L) and/or the block piece (B) at at least one second pressure different from the first pressure, and
    a pump device (PE) which separates a low-pressure section (NDA) from a high-pressure section (HDA) of the hydraulic arrangement (HA) and serves the purpose of loading the pressure medium, which is fed by way of the low-pressure section (NDA), in defined manner with pressure and of conveying it under pressure to the nozzle arrangement (DA) in the high-pressure section (HDA),
    characterized in that the pump device (PE) comprises at least one high-pressure pump (HP1, HP2) drivable by an associated rotary drive (SM1, SM2), the rotational speed of which is variable for setting the first pressure or the second pressure,
    wherein the nozzle arrangement (DA) in the high-pressure section (HDA) of the hydraulic arrangement (HA) comprises a first nozzle subassembly (DB1) with a first high-pressure nozzle (HD1) for delivery of the high-pressure pressure medium jet for deblocking the workpiece (L) from the associated block piece (B) and a second nozzle subassembly (DB2) with a second high-pressure nozzle (HD2) for delivery of the high-pressure pressure medium jet for cleaning the deblocked workpiece (L) and/or the block piece (B).

5. A hydraulic arrangement (HA) according to claim 4, characterized in that the nozzle arrangement (DA) in the high-pressure section (HDA) of the hydraulic arrangement (HA) comprises a third nozzle subassembly (DB3) with a third high-pressure nozzle (HD3) for delivery of a high-pressure pressure medium jet for cleaning the block piece (B) and/or the workpiece (L).

6. A hydraulic arrangement (HA) according to claim 4, characterized in that:
    the pump device (PE) comprises a first high-pressure pump (HP1) and a second high-pressure pump (HP2), wherein at least the first pressure can be generated by the first high-pressure pump (HP1) and at least the second pressure can be generated by the second high-pressure pump (HP2); and
    the first high-pressure pump (HP1) and the second high-pressure pump (HP2) are arranged in parallel, wherein each of the high-pressure pumps (HP1, HP2) is selectably connectible with each of the high-pressure nozzles (HD1, HD2; HD1, HD2, HD3) by way of a common distributor device (VE) in the high-pressure section (HDA) of the hydraulic arrangement (HA).

7. A hydraulic arrangement (HA) according to claim 6, characterized in that the distributor device (VE) comprises two supply lines (VS1, VS2) which are each in fluid connection with a respective one of the high-pressure pumps (HP1, HP2), wherein associated with each supply line (VS1, VS2) is a plurality of high-pressure switching valves (HSV1, HSV3, HSV5; HSV2, HSV4, HSV6) by way of which a fluid connection from the supply lines (VS1, VS2) to the respective high-pressure nozzle (HD1, HD2, HD3) can be selectably produced.

8. A hydraulic arrangement (HA) according to claim 7, characterized in that associated with each supply line (VS1, VS2) as a bypass is a further high-pressure switching valve (HSV7, HSV8) by way of which the respective supply line (VS1, VS2) is selectably connectible with a tank (T) for the pressure medium.

9. A hydraulic arrangement (HA) according to claim 7, characterized in that the high-pressure switching valves (HSV1, HSV2, HSV3, HSV4, HSV5, HSV6, HSV7, HSV8) are pneumatically actuable against a spring bias.

10. A hydraulic arrangement (HA) according to claim 9, characterized in that the high-pressure switching valves (HSV1, HSV2, HSV3, HSV4, HSV5, HSV6, HSV7, HSV8) are spring-biased into closed setting.

11. A hydraulic arrangement (HA) according to claim 7, characterized in that associated with each supply line (VS1, VS2) is an excess-pressure valve (ÜV1, ÜV2) by way of which the respective supply line (VS1, VS2) is connectible with a tank (T) for the pressure medium if a predetermined pressure is exceeded and/or each supply line (VS1, VS2) can be hydraulically relieved by way of an emergency discharge (KH1, KH2) and/or is connected with a pressure measuring device (M2, M3).

12. A hydraulic arrangement (HA) according to claim 7, characterized in that the distributor device (VE) comprises a common valve block (VB) in which the supply lines (VS1, VS2) are formed as channels and which carries the high-pressure switching valves (HSV1, HSV2, HSV3, HSV4, HSV5, HSV6, HSV7, HSV8).

13. A hydraulic arrangement (HA) for an apparatus (AV) for deblocking optical workpieces (L) from associated block pieces (B), comprising
- a nozzle arrangement (DA) for delivery of high-pressure pressure medium jets for deblocking the workpiece (L) from the associated block piece (B) at a first pressure and for cleaning the deblocked workpiece (L) and/or the block piece (B) at at least one second pressure different from the first pressure, and
- a pump device (PE) which separates a low-pressure section (NDA) from a high-pressure section (HDA) of the hydraulic arrangement (HA) and serves the purpose of loading the pressure medium, which is fed by way of the low-pressure section (NDA), in defined manner with pressure and of conveying it under pressure to the nozzle arrangement (DA) in the high-pressure section (HDA),
- characterized in that the pump device (PE) comprises at least one high-pressure pump (HP1, HP2) drivable by an associated rotary drive (SM1, SM2), the rotational speed of which is variable for setting the first pressure or the second pressure,
- wherein provided in the low-pressure section (NDA) is at least one low-pressure nozzle (ND1, ND2, ND3) for cleaning purposes, which can be supplied with the pressure medium by way of a low-pressure switching valve (NSV1, NSV2) connected with a feed line (ZL) for the pressure medium.

14. A hydraulic arrangement (HA) for an apparatus (AV) for deblocking optical workpieces (L) from associated block pieces (B), comprising:
- a nozzle arrangement (DA) for delivery of high-pressure pressure medium jets for deblocking the workpiece (L) from the associated block piece (B) at a first pressure and for cleaning the deblocked workpiece (L) and/or the block piece (B) at at least one second pressure different from the first pressure, and
- a pump device (PE) which separates a low-pressure section (NDA) from a high-pressure section (HDA) of the hydraulic arrangement (HA) and serves the purpose of loading the pressure medium, which is fed by way of the low-pressure section (NDA), in defined manner with pressure and of conveying it under pressure to the nozzle arrangement (DA) in the high-pressure section (HDA),
- characterized in that the pump device (PE) comprises a first high-pressure pump (HP1) and a second high-pressure pump (HP2), wherein at least the first pressure can be generated by the first high-pressure pump (HP1) and at least the second pressure can be generated by the second high-pressure pump (HP2),
- wherein the first high-pressure pump (HP1) and the second high-pressure pump (HP2) are arranged in parallel, wherein each of the high-pressure pumps (HP1, HP2) is selectably connectible with each of the high-pressure nozzles (HD1, HD2; HD1, HD2, HD3) by way of a common distributor device (VE) in the high-pressure section (HDA) of the hydraulic arrangement (HA) so that each of said high-pressure pumps (HP1, HP2) can operate each of said high-pressure nozzles (HD1, HD2, HD3) by way of a flexible hydraulic distribution.

15. A hydraulic arrangement (HA) according to claim 14, characterized in that the high-pressure pumps (HP1, HP2) of the pump device (PE) are constructed as plunger pumps.

16. A hydraulic arrangement (HA) according to claim 14, characterized in that the distributor device (VE) comprises two supply lines (VS1, VS2) which are each in fluid connection with a respective one of the high-pressure pumps (HP1, HP2), wherein associated with each supply line (VS1, VS2) is a plurality of high-pressure switching valves (HSV1, HSV3, HSV5; HSV2, HSV4, HSV6) by way of which a fluid connection from the supply lines (VS1, VS2) to the respective high-pressure nozzle (HD1, HD2, HD3) can be selectably produced.

17. A hydraulic arrangement (HA) according to claim 16, characterized in that associated with each supply line (VS1, VS2) as a bypass is a further high-pressure switching valve (HSV7, HSV8) by way of which the respective supply line (VS1, VS2) is selectably connectible with a tank (T) for the pressure medium.

18. A hydraulic arrangement (HA) according to claim 16, characterized in that the high-pressure switching valves (HSV1, HSV2, HSV3, HSV4, HSV5, HSV6, HSV7, HSV8) are pneumatically actuable against a spring bias.

19. A hydraulic arrangement (HA) according to claim 18, characterized in that the high-pressure switching valves (HSV1, HSV2, HSV3, HSV4, HSV5, HSV6, HSV7, HSV8) are spring-biased into closed setting.

20. A hydraulic arrangement (HA) according to claim 16, characterized in that associated with each supply line (VS1, VS2) is an excess-pressure valve (ÜV1, ÜV2) by way of which the respective supply line (VS1, VS2) is connectible with a tank (T) for the pressure medium if a predetermined pressure is exceeded and/or each supply line (VS1, VS2) can be hydraulically relieved by way of an emergency discharge (KH1, KH2) and/or is connected with a pressure measuring device (M2, M3).

21. A hydraulic arrangement (HA) according to claim 16, characterized in that the distributor device (VE) comprises a common valve block (VB) in which the supply lines (VS1, VS2) are formed as channels and which carries the high-pressure switching valves (HSV1, HSV2, HSV3, HSV4, HSV5, HSV6, HSV7, HSV8).

22. A hydraulic arrangement (HA) for an apparatus (AV) for deblocking optical workpieces (L) from associated block pieces (B), comprising:
   a nozzle arrangement (DA) for delivery of high-pressure pressure medium jets for deblocking the workpiece (L) from the associated block piece (B) at a first pressure and for cleaning the deblocked workpiece (L) and/or the block piece (B) at at least one second pressure different from the first pressure, and
   a pump device (PE) which separates a low-pressure section (NDA) from a high-pressure section (HDA) of the hydraulic arrangement (HA) and serves the purpose of loading the pressure medium, which is fed by way of the low-pressure section (NDA), in defined manner with pressure and of conveying it under pressure to the nozzle arrangement (DA) in the high-pressure section (HDA),
   characterized in that the pump device (PE) comprises a first high-pressure pump (HP1) and a second high-pressure pump (HP2), wherein at least the first pressure can be generated by the first high-pressure pump (HP1) and at least the second pressure can be generated by the second high-pressure pump (HP2),
   wherein a respective servomotor (SM1, SM2) is associated as rotary drive with each of the high-pressure pumps (HP1, HP2) of the pump device (PE) and is drivingly connected with the respective high-pressure pump (HP1, HP2) by way of an angle transmission (WG1, WG2).

23. A hydraulic arrangement (HA) according to claim 22, characterized in that the high-pressure pumps (HP1, HP2) of the pump device (PE) are of identical construction.

24. A hydraulic arrangement (HA) for an apparatus (AV) for deblocking optical workpieces (L) from associated block pieces (B), comprising:
   a nozzle arrangement (DA) for delivery of high-pressure pressure medium jets for deblocking the workpiece (L) from the associated block piece (B) at a first pressure and for cleaning the deblocked workpiece (L) and/or the block piece (B) at at least one second pressure different from the first pressure, and
   a pump device (PE) which separates a low-pressure section (NDA) from a high-pressure section (HDA) of the hydraulic arrangement (HA) and serves the purpose of loading the pressure medium, which is fed by way of the low-pressure section (NDA), in defined manner with pressure and of conveying it under pressure to the nozzle arrangement (DA) in the high-pressure section (HDA),
   characterized in that the pump device (PE) comprises a first high-pressure pump (HP1) and a second high-pressure pump (HP2), wherein at least the first pressure can be generated by the first high-pressure pump (HP1) and at least the second pressure can be generated by the second high-pressure pump (HP2),
   wherein the nozzle arrangement (DA) in the high-pressure section (HDA) of the hydraulic arrangement (HA) comprises a first nozzle subassembly (DB1) with a first high-pressure nozzle (HD1) for delivery of the high-pressure pressure medium jet for deblocking the workpiece (L) from the associated block piece (B) and a second nozzle subassembly (DB2) with a second high-pressure nozzle (HD2) for delivery of the high-pressure pressure medium jet for cleaning the deblocked workpiece (L) and/or the block piece (B).

* * * * *